United States Patent
Chen et al.

(10) Patent No.: US 9,423,642 B2
(45) Date of Patent: Aug. 23, 2016

(54) PACKAGE STRUCTURE OF DRIVING APPARATUS OF DISPLAY

(71) Applicant: Raydium Semiconductor Corporation, Hsinchu (TW)

(72) Inventors: Ching-Yung Chen, Taoyuan (TW); Po-Cheng Lin, Hsinchu (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 0 days.

(21) Appl. No.: 14/637,481

(22) Filed: Mar. 4, 2015

(65) Prior Publication Data
US 2015/0253618 A1    Sep. 10, 2015

(30) Foreign Application Priority Data
Mar. 7, 2014  (TW) ............... 103107977 A

(51) Int. Cl.
*G02F 1/133*  (2006.01)
*G02F 1/1333*  (2006.01)
*G02F 1/1345*  (2006.01)

(52) U.S. Cl.
CPC ...... *G02F 1/133382* (2013.01); *G02F 1/13306* (2013.01); *G02F 1/13452* (2013.01)

(58) Field of Classification Search
CPC .......... G02F 1/13306; G02F 1/133382; H01L 25/0655; H01L 25/072
See application file for complete search history.

(56) References Cited

U.S. PATENT DOCUMENTS 5,200,847 A * 4/1993 Mawatari ............ G02F 1/13452
257/E25.016
5,737,272 A * 4/1998 Uchiyama ........... G02F 1/13452
257/E23.004

* cited by examiner

*Primary Examiner* — Jeffrey Zweizig

(57) ABSTRACT

The invention discloses a package structure of a driving apparatus of a display. The driving apparatus of the display includes a plurality of driving units. The package structure includes a substrate and a plurality of package units. The substrate is used to carry the plurality of driving units. The plurality of driving units is apart to each other. The plurality of package units is used to package the plurality of driving units respectively to form a plurality of driving unit package body apart to each other. A total output channel number of the driving apparatus of the display equals to a total channel number of the plurality of driving units. This package structure can avoid heat concentration on the driving apparatus of the display to achieve good cooling effect and output effectiveness of the driving apparatus of the display will be not reduced accordingly.

10 Claims, 3 Drawing Sheets

PACKAGE STRUCTURE OF DRIVING APPARATUS OF DISPLAY

BACKGROUND OF THE INVENTION

1. Field of the Invention

The invention relates to a LCD apparatus; in particular, to a package structure of a driving apparatus of a LCD apparatus capable of effectively dissipating heat without additional costs.

2. Description of the Related Art

With the progress of LCD apparatus technologies, the size of LCD panel becomes larger and the driving IC of the LCD apparatus also needs more output channels. For example, the total output channel number of the driving IC changes from 384, 480, 720 . . . 1440, to 1920. Since every driving IC needs to drive more output channels, the temperature of the driving IC will be higher and over-heat issue will become more serious.

For example, as shown in FIG. 1, the chip on film (COF) package structure 1 of the driving apparatus of the LCD apparatus includes a substrate 10 and a driving unit package body P having 1440 output channels. The driving unit package body P is formed by a package unit 11 packaging a driving unit D having 1440 output channels. Since the driving unit D needs to drive 1440 output channels, the heat generated will be concentrated in the COF package structure 1 and the temperature will be increased, and the over-heat issue will become more serious.

In order to solve the above-mentioned over-heat issue, the following conventional solutions are used in the prior arts.

(1) Increasing the thickness of Cu: For example, the thickness of Cu in the COF package structure can be increased from 8 um to 12 um.

(2) Using a dual Cu-film structure: For example, two Cu-films having thickness of 8 um can be used in the COF package structure.

(3) Pasting a heat-dissipating film on a PI surface in the COF package structure.

(4) Disposing additional heat-dissipating modules in the COF package structure to help heat dissipation.

The above-mentioned conventional solutions can be helpful to dissipate the heat generated by the driving IC; however, the above-mentioned conventional solutions also increase the cost of the driving IC at least 20%~100%, and this will seriously affect the competitiveness of the driving IC in the market.

SUMMARY OF THE INVENTION

Therefore, the invention provides a package structure of a driving apparatus of a display to solve the above-mentioned problems occurred in the prior arts.

An embodiment of the invention is a package structure of a driving apparatus of a display. In this embodiment, the driving apparatus includes a plurality of driving units. The package structure includes a substrate and a plurality of package units. The substrate is used to carry the plurality of driving units. The plurality of driving units is apart to each other. The plurality of package units is used to package the plurality of driving units respectively to form a plurality of driving unit package body apart to each other. A total output channel number of the driving apparatus of the display equals to a total channel number of the plurality of driving units.

In an embodiment of the invention, the package structure is a chip on film (COF) package structure.

In an embodiment of the invention, the plurality of driving units has different functions respectively.

In an embodiment of the invention, the driving apparatus is a source driver.

In an embodiment of the invention, the plurality of driving units comprises a receiver unit and at least one high-speed processing unit.

In an embodiment of the invention, the substrate has an input terminal and an output terminal, the input terminal is coupled to the receiver unit and the at least one high-speed processing unit respectively, the receiver unit is coupled to the at least one high-speed processing unit, the at least one high-speed processing unit is coupled to the output terminal.

In an embodiment of the invention, the at least one high-speed processing unit comprises a transistor logic unit, a digital-to-analog converter, and a buffer unit.

In an embodiment of the invention, the receiver unit and the at least one high-speed processing unit are made by a low-order process and a high-order process respectively.

In an embodiment of the invention, distances between any two adjacent driving units of the plurality of driving units are the same.

In an embodiment of the invention, distances between any two adjacent driving units of the plurality of driving units are different.

Compared to the prior arts, the package structure of the invention can be applied to the driving apparatus of the LCD apparatus and achieve good heat-dissipating effect without adding additional heat-dissipating modules or changing the original design of heat-dissipating mechanism. In addition, the package structure of the driving apparatus of the invention can be also divided into different package regions according to the different functions of the driving units to achieve the optimization of chip performance and cost.

The advantage and spirit of the invention may be understood by the following detailed descriptions together with the appended drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In order to avoid the over-heat of a driving IC due to more output channels driven by the driving IC of a LCD apparatus, in a package structure of the invention, the number of the output channels driven by each driving IC is controlled in a proper range and a plurality of separated driving ICs are used to maintain the total output channel number of the driving apparatus in LCD apparatus unchanged.

By doing so, the total output channel number of the driving apparatus in LCD apparatus will not be decreased and improve the over-heat of the driving IC by dividing the package structure into different package regions, so that the costs of additional heat-dissipating modules or changing the original design of heat-dissipating mechanism can be saved.

A preferred embodiment of the invention is a package structure of a driving apparatus of a display. In this embodiment, the package structure is a chip on film (COF) package structure applied to a source driver of a LCD apparatus, but not limited to this.

Figure 2:
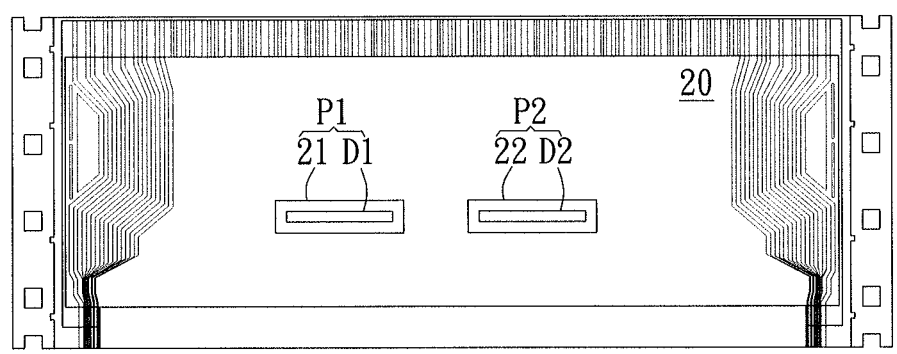
FIG. 2 illustrates a schematic diagram of two driving unit package bodies having 720 output channels in the COF package structure of the driving apparatus of the LCD apparatus in the invention.

Please refer to FIG. 2. FIG. 2 illustrates a schematic diagram of two driving unit package bodies having 720 output channels in the COF package structure applied to the driving apparatus of the LCD apparatus in the invention. As shown in FIG. 2, the COF package structure 2 applied to the driving apparatus of the LCD apparatus includes a substrate 20 and two package units 21~22.

In this embodiment, the substrate 20 is used to carry two driving units D1~D2 of the driving apparatus, and these two driving units D1~D2 are apart to each other. The two package units 21~22 are used to package the two driving units D1~D2 respectively to form two driving unit package bodies P1~P2 which are apart to each other. Since these two driving units D1~D2 both have 720 output channels and a total output channel number of the driving apparatus equals to a total channel number of these two driving units D1~D2, the total output channel number of the driving apparatus equals to 720*2=1440.

Figure 1:
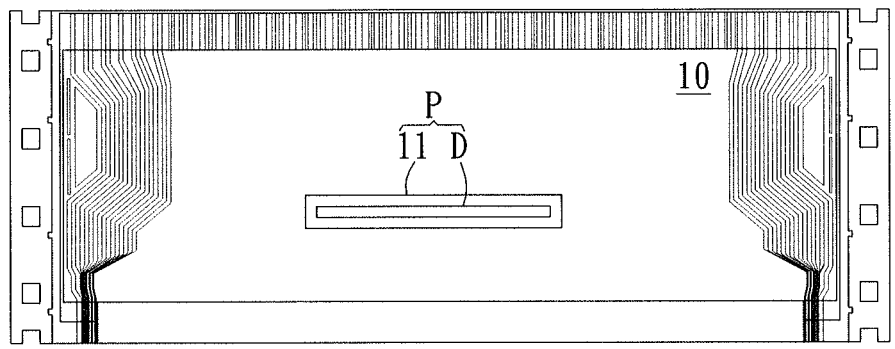
FIG. 1 illustrates a schematic diagram of the conventional driving IC package body having 1440 output channels in the COF package structure of the driving apparatus of the LCD apparatus in the prior arts.

After comparing FIG. 2 with FIG. 1, it can be found that the two driving units D1~D2 in the COF package structure 2 of FIG. 2 both have 720 output channels, so that the total channel number of the two driving units D1~D2 equals to the total output channel number of the driving unit D in the COF package structure 1 of FIG. 1. Therefore, the total output channel number of the driving apparatus in LCD apparatus can be maintained unchanged, but the over-heat of the driving IC can be improved, so that the costs of additional heat-dissipating modules or changing the original design of heat-dissipating mechanism can be saved.

Figure 3:
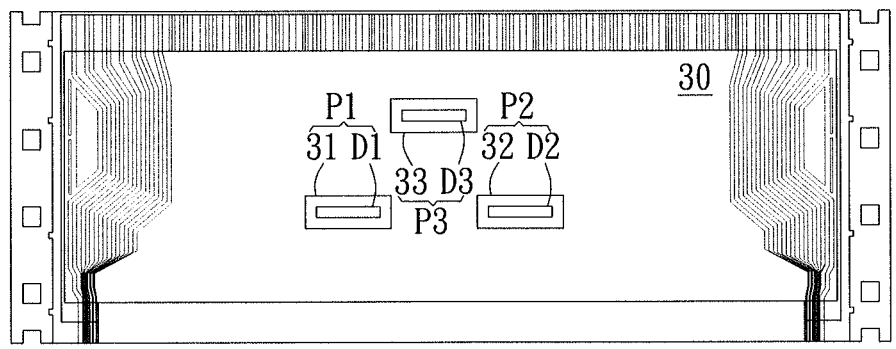
FIG. 3 illustrates a schematic diagram of three driving unit package bodies having 480 output channels in the COF package structure of the driving apparatus of the LCD apparatus in the invention.

Please refer to FIG. 3. FIG. 3 illustrates a schematic diagram of three driving unit package bodies having 480 output channels in the COF package structure of the driving apparatus of the LCD apparatus in the invention. As shown in FIG. 3, the COF package structure 3 applied to the driving apparatus of the LCD apparatus includes a substrate 30 and three package units 31~33.

In this embodiment, the substrate 30 is used to carry three driving units D1~D3 of the driving apparatus, and these three driving units D1~D3 are apart to each other. The three package units 31~33 are used to package the three driving units D1~D3 respectively to form three driving unit package bodies P1~P3 which are apart to each other. Since these three driving units D1~D3 all have 480 output channels and a total output channel number of the driving apparatus equals to a total channel number of these three driving units D1~D3, the total output channel number of the driving apparatus equals to 480*3=1440.

As shown in FIG. 3, the distances between any two of the three driving unit package bodies P1~P3 in the COF package structure 3 can be the same or different without specific limitations.

After comparing FIG. 3 with FIG. 1, it can be found that the three driving units D1~D3 in the COF package structure 3 of FIG. 3 all have 480 output channels, so that the total channel number of the three driving units D1~D3 equals to the total output channel number of the driving unit D in the COF package structure 1 of FIG. 1. Therefore, the total output channel number of the driving apparatus in LCD apparatus can be maintained unchanged, but the over-heat of the driving IC can be improved, so that the costs of additional heat-dissipating modules or changing the original design of heat-dissipating mechanism can be saved.

After comparing FIG. 3 with FIG. 2, it can be found that the heat-dissipating effect of the three driving unit package bodies P1~P3 in the COF package structure 3 of FIG. 3 will be better than the heat-dissipating effect of the two driving unit package bodies P1~P2 in the COF package structure 2 of FIG. 2, and the heat-dissipating effect of the three driving unit package bodies P1~P3 in the COF package structure 3 of FIG. 3 and the heat-dissipating effect of the two driving unit package bodies P1~P2 in the COF package structure 2 of FIG. 2 are both better than the heat-dissipating effect of the driving unit package body P in the COF package structure 1 of FIG. 1.

In addition, the package structure of the driving apparatus can be also divided into different package regions according to the different functions of the driving units to achieve the optimization of chip performance and cost.

Figure 4:
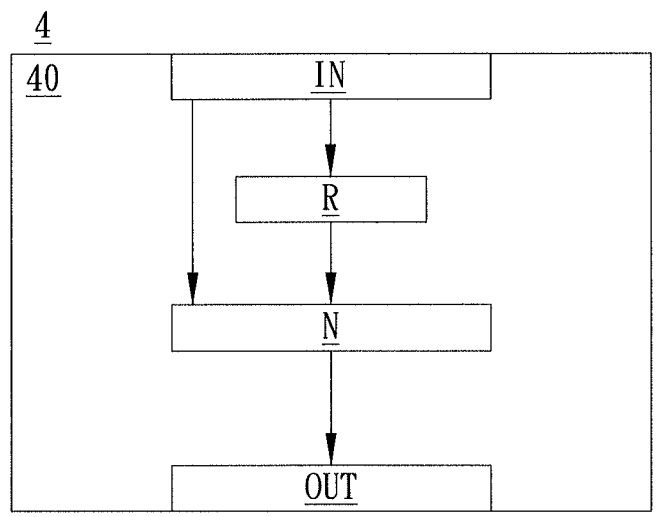
FIG. 4 illustrates a schematic diagram of one receiver unit package body and one high-speed processing unit package body in the COF package structure of the driving apparatus of the LCD apparatus in the invention.

Please refer to FIG. 4. FIG. 4 illustrates a schematic diagram of one receiver unit package body and one high-speed processing unit package body in the COF package structure of the driving apparatus of the LCD apparatus in the invention.

As shown in FIG. 4, in the COF package structure 4, the substrate 40 has an input terminal IN and an output terminal OUT. The input terminal IN is coupled to a receiver unit package body R and a high-speed processing unit package body N respectively; the receiver unit package body R is coupled to the high-speed processing unit package body N; the high-speed processing unit package body N is coupled to the output terminal OUT.

In practical applications, the high-speed processing unit package body N is formed by the package unit packaging the high-speed processing unit; the receiver unit package body R is formed by the package unit packaging the receiver unit. The high-speed processing unit can include a transistor logic unit, a digital-to-analog converter, and a buffer unit, but not limited to this.

The receiver unit in the receiver unit package body R not only receives a data signal, a timing signal, and a setup signal from the receiver unit, but also receives a power from the input terminal IN and outputs an output signal to the output terminal OUT.

It should be noticed that the high-speed processing unit package body N and the receiver unit package body R in the COF package structure 4 are apart to each other; therefore, different processes can be used to make the high-speed processing unit and the receiver unit based on practical needs. For example, a high-level process is used to make the high-speed processing unit and a low-level process is used to make the receiver unit instead of using the high-level process to make both the high-speed processing unit and the receiver unit which are packaged in the same package body. Therefore, the manufacturing cost can be reduced and the manufacturing process can be simplified.

In addition, since the high-speed processing unit package body N and the receiver unit package body R in the COF package structure 4 are apart to each other, the receiver unit will be not interfered by the high-speed processing unit in high-frequency.

Figure 5:
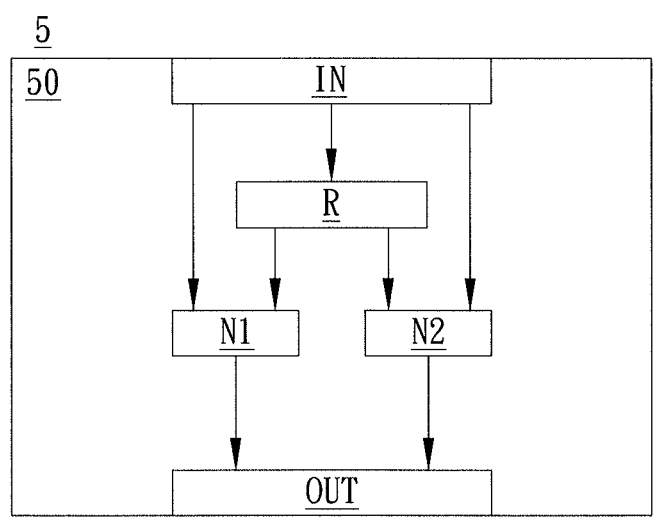
FIG. 5 illustrates a schematic diagram of one receiver unit package body and two high-speed processing unit package bodies in the COF package structure of the driving apparatus of the LCD apparatus in the invention.

Please refer to FIG. 5. FIG. 5 illustrates a schematic diagram of one receiver unit package body and two high-speed processing unit package bodies in the COF package structure of the driving apparatus of the LCD apparatus in the invention.

As shown in FIG. 5, in the COF package structure 5, the substrate 50 has an input terminal IN and an output terminal OUT. The input terminal IN is coupled to a receiver unit package body R and two high-speed processing unit package bodies N1~N2 respectively; the receiver unit package body R is coupled to the two high-speed processing unit package bodies N1~N2 respectively; the two high-speed processing unit package bodies N1~N2 are coupled to the output terminal OUT respectively.

In practical applications, the two high-speed processing unit package bodies N1~N2 are formed by the package unit packaging the two high-speed processing units respectively; the receiver unit package body R is formed by the package unit packaging the receiver unit. The high-speed processing units can include a transistor logic unit, a digital-to-analog converter, and a buffer unit, but not limited to this.

The receiver unit in the receiver unit package body R receives a data signal and a power from the input terminal IN and outputs the data signal, the timing signal, and the setup signal to the high-speed processing units in the high-speed processing unit package bodies N1~N2 respectively.

The high-speed processing units in the high-speed processing unit package bodies N1~N2 not only receives the data signal, the timing signal, and the setup signal from the receiver unit, but also receives a power from the input terminal IN and outputs an output signal to the output terminal OUT.

It should be noticed that the high-speed processing unit package bodies N1~N2 and the receiver unit package body R in the COF package structure 5 are apart to each other; therefore, different processes can be used to make the high-speed processing units and the receiver unit based on practical needs. For example, a high-level process is used to make the high-speed processing units and a low-level process is used to make the receiver unit instead of using the high-level process to make both the high-speed processing units and the receiver unit which are packaged in the same package body. Therefore, the manufacturing cost can be reduced and the manufacturing process can be simplified.

With the increased resolution of the LCD apparatus, the operational frequency of a single driving IC becomes higher due to the requirements of high resolution and high frequency. Therefore, since the high-speed processing unit package bodies N1~N2 and the receiver unit package body R in the COF package structure 5 are apart to each other, the receiver unit will be not interfered by the high-speed processing units in high-frequency. Comparing FIG. 5 with FIG. 4, the high-speed processing unit package bodies N1~N2 which are apart to each other in FIG. 5 can achieve better heat-dissipating effect than the single high-speed processing unit package body N in FIG. 4.

Compared to the prior arts, the package structure of the invention can be applied to the driving apparatus of the LCD apparatus and achieve good heat-dissipating effect without adding additional heat-dissipating modules or changing the original design of heat-dissipating mechanism. In addition, the package structure of the driving apparatus of the invention can be also divided into different package regions according to the different functions of the driving units to achieve the optimization of chip performance and cost.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. A package structure, applied to a driving apparatus of a display, the driving apparatus comprising a plurality of driving units, the package structure comprising:
    a substrate, for carrying the plurality of driving units, wherein the plurality of driving units is apart to each other and includes a receiver unit and at least one high-speed processing unit; and
    a plurality of package units, for packaging the plurality of driving units respectively to form a plurality of driving unit package body apart to each other;
    wherein a total output channel number of the driving apparatus equals to a total channel number of the plurality of driving units.

2. The package structure of claim 1, wherein the package structure is a chip on film (COF) package structure.

3. The package structure of claim 1, wherein the plurality of driving units has different functions respectively.

4. The package structure of claim 1, wherein the driving apparatus is a source driver.

5. The package structure of claim 1, wherein the substrate has an input terminal and an output terminal, the input terminal is coupled to the receiver unit and the at least one high-speed processing unit respectively, the receiver unit is coupled to the at least one high-speed processing unit, the at least one high-speed processing unit is coupled to the output terminal.

6. The package structure of claim 1, wherein the at least one high-speed processing unit comprises a transistor logic unit, a digital-to-analog converter, and a buffer unit.

7. The package structure of claim 1, wherein the receiver unit and the at least one high-speed processing unit are made by a low-order process and a high-order process respectively.

8. The package structure of claim 1, wherein distances between any two adjacent driving units of the plurality of driving units are the same.

9. The package structure of claim 1, wherein distances between any two adjacent driving units of the plurality of driving units are different.

10. A package structure, applied to a driving apparatus of a display, the driving apparatus comprising a plurality of driving units, the package structure comprising:
    a substrate, for carrying the plurality of driving units, wherein the plurality of driving units is apart to each other; and
    a plurality of package units, for packaging the plurality of driving units respectively to form a plurality of driving unit package body apart to each other;
    wherein a total output channel number of the driving apparatus equals to a total channel number of the plurality of driving units, and wherein distances between any two adjacent driving units of the plurality of driving units are different.

* * * * *